United States Patent
Brigmon et al.

(10) Patent No.: US 7,472,747 B1
(45) Date of Patent: Jan. 6, 2009

(54) BIOLOGICAL ENHANCEMENT OF HYDROCARBON EXTRACTION

(75) Inventors: Robin L. Brigmon, North Augusta, SC (US); Christopher J. Berry, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 20 days.

(21) Appl. No.: 11/888,463

(22) Filed: Aug. 1, 2007

(51) Int. Cl.
*E21B 43/22* (2006.01)

(52) U.S. Cl. ............... 166/246; 166/268; 166/372

(58) Field of Classification Search ............ None
See application file for complete search history.

(56) References Cited

U.S. PATENT DOCUMENTS

| | | |
|---|---|---|
| 4,349,633 A | 9/1982 | Worne et al. |
| 4,522,261 A | 6/1985 | McInerney et al. |
| 4,640,767 A | 2/1987 | Zajic et al. |
| 4,905,761 A | 3/1990 | Bryant |
| 5,055,180 A | 10/1991 | Klaila |
| 5,111,883 A | 5/1992 | Savery |
| 5,163,510 A | 11/1992 | Sunde |
| 5,221,159 A | 6/1993 | Billings et al. |
| 5,610,062 A * | 3/1997 | Tyndall ............... 435/252.4 |
| 5,968,349 A | 10/1999 | Duyvesteyn et al. |
| 6,074,558 A | 6/2000 | Duyvesteyn et al. |
| 6,110,875 A * | 8/2000 | Tjon-Joe-Pin et al. ....... 507/201 |
| 6,156,946 A | 12/2000 | Coyle et al. |
| 6,387,278 B1 | 5/2002 | Leif et al. |
| 6,543,535 B2 * | 4/2003 | Converse et al. ............ 166/246 |
| 6,758,270 B1 | 7/2004 | Sunde et al. |
| 2007/0092930 A1 * | 4/2007 | Lal et al. .................... 435/41 |

FOREIGN PATENT DOCUMENTS

| | | |
|---|---|---|
| RU | 2 228 953 | 5/2004 |
| WO | WO 00/56668 A | 9/2000 |

OTHER PUBLICATIONS

U.S. Appl. No. 10/712,491, filed Nov. 13, 2003, Brigmon.
Quentmeier & Friedrich, "Transfer and Expression of Degradative and Antibiotic Resistance Plasmids in Acidolphilic Bacteria", App & Env Microbiology, vol. 60, No. 3, Mar. 1994, pp. 973-978.
Kastner et al, "Impact of Inoculation Protocols, Salinity, and pH on the Degradation of Polycyclic Aromatic Hydrocarbons (PAHs) and Survival of PAH-Degrading Bacteria Introduced into Soil", App & Env Microbiology, vol. 64, No. 1, Jan. 1998, pp. 359-362.
Grosser et al, "Indigenous and Enhanced Mineralization of Pyrene, Benzo[a]pyrene, and Carbazole in Soils", App & Env Microbiology, vol. 57, No. 12, Dec. 1991, pp. 3462-3469.

(Continued)

*Primary Examiner*—Zakiya W. Bates
(74) *Attorney, Agent, or Firm*—J. Bennett Mullinax, LLC (57) ABSTRACT

A method of microbial enhanced oil recovery for recovering oil from an oil-bearing rock formation is provided. The methodology uses a consortium of bacteria including a mixture of surfactant producing bacteria and non-surfactant enzyme producing bacteria which may release hydrocarbons from bitumen containing sands. The described bioprocess can work with existing petroleum recovery protocols. The consortium microorganisms are also useful for treatment of above oil sands, ground waste tailings, subsurface oil recovery, and similar materials to enhance remediation and/or recovery of additional hydrocarbons from the materials.

11 Claims, 6 Drawing Sheets

OTHER PUBLICATIONS

Coates et al, "Oxidation of Polycyclic Aromatic Hydrocarbons under Sulfate-Reducing Conditions", App & Env. Microbiology, vol. 62, No. 3, Mar. 1996, pp. 1099-1101.

Stapleton et al, "Biodegradation of Aromatic Hydrocarbons in an Extremely Acidic Environment", App & Env Microbiology, vol. 64, No. 11, Nov. 1998, pp. 4180-4184.

Kanaly & Harayama, "Biodegradation of High-Molecular-Weight Polycyclic Aromatic Hydrocarbons by Bacteria", J of Bacteriology, vol. 182, No. 8, Apr. 2000, pp. 2059-2067.

Gogolev & Wilke, "Combination effects of heavy metals and fluoranthene on soil bacteria", Biol Fertil Soils (1977) 25:274-278.

Eaton & Chapman, "Formation of Indigo and Related Compounds from Indolecarboxylic Acids by Aromatic Acid-Degrading Bacteria: Chromogenic Reactions for Cloning Genes Encoding Dioxygenases That Act on Aromatic Acids", J of Bacteriology, vol. 177, No. 23, Dec. 1995, pp. 6983-6988.

Zink & Lorber, Mass Spectral Identification of Metabolites Formed by Microbial Degradation of Polycyclic Aromatic Hydrocarbons (PAH), Chemosphere, vol. 31, No. 9, 1995, pp. 4077-4084.

MacGillivray & Shiaris, "Biotransformation of Polycyclic Aromatic Hydrocarbons by Yeasts Isolated from Coastal Sediments", App & Env Microbiology, vol. 59, No. 5, May 1993, pp. 1613-1618.

Singleton, D et al: Microbial diversity in an acidic refinery sludge: Abst. Gen. Mtg. Am. Soc. Microbiology, V. 101, 2001, p. 637 & 101st Gen. Mtg. Orlando, FL May 20-24, 2001.

Plaza Grazyna et al: "Relationship between soil microbial diversity and bioremediation process at an oil refinery", ACTA Microbiologica Polonica, V. 52, No. 2, 2003, pp. 173-182.

Database WPI, Derwent Pubs., Ltd., London, GB; AN 2004-446832—Blokhin VA et al: "Strain of bacterium *Pseudomonas alcaligenes* MEV used for the removal of petroeum and its products from soil ground & surface water".

Korda, et al: "Petroleum hydrocarbon bioremediation: sampling and analytical techniques, in situ treatments and commercial microorganisms currently used", Appl. Microbiol Biotechnol (1997) 48: 677-686.

Dagher, et al: "Comparative study of five polycyclic aromatic hydrocarbon degrading bacterial strains isolated from contaminated soils", Can. J. Microbiol 43: 368-377 (1997).

Salleh et al: "Bioremediation of Petroleum Hydrocarbon Pollution", Indian Journal of Biotechnology, vol. 2, Jul. 2003, pp. 411-425.

Andreoni et al, "Bacterial communities and enzyme activities of PAHs polluted soils", Chemosphere 57 (2004) 401-412.

Hamana, et al: "Polyamine distribution profiles in newly validated genera and species within the Flavobacterum-Flexibacter-Cytophaga-Sphingobacterium complex", Microbios 106 SR, pp. 105-116, 2001 The Faculty Press, Cambridge, Great Britain.

Communication Relating to the Results of the Partial International Search, PCT/US2005/003405, ISA/EPO, Rijswijk, NL, Sep. 12, 2005, 3 pages.

Heitcamp & Cerniglia, "Effects of Chemical Structure and Exposure on the Microbial Degradation of Polycyclic Aromatic Hydrocarbons in Freshwater & Estuarine Ecosystems", Env. Toxicology & Chem, vol. 6, pp. 535-546, 1987.

Dabrock et al, "Identification & Characterization of a Transmissible Linear Plasmid From Rhodococus erythropolis BD2 That Encodes Isopropylbenzene & Trichlorethene Catabolism", Applied & Env. Microbiology, vol. 60, No. 3, Mar. 1994, pp. 853-860.

Rosselo-Mora et al, "Comparative Biochemical and Genetic Analysis of Naphthalene Degradation among *Pseudomonas stutzeri* Strains", Applied & Env. Microbiology, vol. 60, No. 3, Mar. 1994, pp. 966-972.

Juhasz et al, "Microbial degradation and detoxification of high molecular weight polycyclic aromatic hydrocarbons by *Stenotrophomonas maltophilia* strain VUN 10,003", Letters in App. Microbiology 2000, vol. 30, pp. 396-401.

Story et al, "Identification of four structural genes and two putative promoters necessary for utilization of naphthalene, phenanthrene, and fluoranthene by *Sphingomonas paucimobilis* var. EPA505", Gene, vol. 260, 2000, pp. 155-169.

Hammer et al, "Isolation and Characterization of a Dibenzofuran-Degrading Yeast: Identification of Oxidation and Ring Cleavage Products", App. & Env Microbiology, vol. 64, No. 6. Jun. 1998, pp. 2215-2219.

Gorden et al, "Rapid screening for bacteria capable of degrading toxic organic compounds", J of Microbiological Methods vol. 18, 1993, pp. 339-347.

Bezalel et al, "Initial Oxidation Products in the Metabolism of Pyrene, Anthracene, Fluorene, and Dibenzothiophene by the White Rot Fungus Pleurotus ostreatus", App & Env Microbiology, vol. 62, No. 7, Jul. 1996, pp. 2554-2559.

Smit et al, "Analysis of Fungal Diversity in the Wheat Rhizosphere by Sequencing of Cloned PCR-Amplified Genes Encoding 18S rRNA and Temperature Gradient Gel Electrophoresis", App & Env Microbiology, vol. 65, No. 6, Jun. 1999 pp. 2614-2621.

Straub et al, "Anaerobic, Nitrate-Dependent Microbial Oxidation of Ferrous Iron", App & Env Microbiology, vol. 62, No. 4, Apr. 1996, pp. 1458-1460.

Trzesicka-Mlynarz & Ward, "Degradation of polycyclic aromatic hydrocarbons (PAHs) by a mixed culture and its component pure cultures, obtained from PAH-contaminated soil", Can J. Microbiology 41:470-476 (1995).

Ishida & Nakumura, "Trichloroethylene Degradation by *Ralstonia* sp. KN1-10A Constituitively Expressing Phenol Hydroxylase: Transformation Products, NADH Limitation, and Product Toxicity", J.Bioscience & Bioengineering, vol. 89, No. 5, 438-445, 2000.

Nakamura, Ishida & Iizumi, "Constitutive Trichlorethylene Degradation Led by tac Promoter Chromosomally Integrated Upstream of Phenol Hydroxylase Genes of *Ralstonia* sp. KN1 anad Its Nucleotide Sequence Analysis", J. Bioscience & Bioengineering, vol. 89, No. 1, 47-54, 2000.

Kastner, Breuer-Jammali & Mahro, "Enumeration and characterization of the soil microflora from hydrocarbon-contaminated soil sites able to mineralize polycyclic aromatic hydrocarbons (PAH)", J. Microbiol Biotechnol (1994) 41:267-273.

* cited by examiner

BIOLOGICAL ENHANCEMENT OF HYDROCARBON EXTRACTION

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

The present invention relates to a method of microbial enhanced hydrocarbon extraction, processing, and recovery. The present invention further relates to a process of degrading hydrocarbons, process byproducts, and hydrocarbon waste associated with oil fields and petroleum extraction facilities.

BACKGROUND OF THE INVENTION

Oil which may be present in subterranean rock formations can generally be removed by drilling and allowing pressure within the oil field to force the oil up to the borehole. When the existing over pressure diminishes, an artificial oil pressure can be accomplished by injecting water into the formation to flush out additional free oil in a process known as secondary removal.

Oil present in tar sands can generally be removed by agitation, heat, and mixing in a process to remove the oil by floatation. Skimming can be used to remove additional oil in aqueous runoff from this process. It is known that tailings from these treated tar sands can still contain a high percentage of hydrocarbons.

For many types of soils, following secondary removal a great deal of oil remains. For certain geological materials, oil remaining after secondary removal may easily exceed 50% of the volume of removed oil. The remaining oil-bearing geological formation contains a substantial amount of oil within its pores or channels.

A portion of this residual oil can be displaced by microorganisms using microbial enhanced oil recovery (MEOR) in which the metabolism of the microorganisms causes displacement of the oil that may subsequently be recovered by the production wells.

In U.S. Pat. No. 4,522,261 which is incorporated herein by reference, it is disclosed to use surfactant producing *Bacillus licheniformis* which is useful for solubilizing oil. These surfactants may be used by direct injection into the reservoir in order to avoid plugging difficulties. However, it is also known that microbes can be injected into production wells to increase the yield of recovered oil.

U.S. Pat. No. 4,905,761, which is incorporated herein by reference, describes a microbial enhanced oil recovery process in which microorganisms are introduced by injection wells along with a nutrient solution for obtaining additional oil from oil-bearing reservoirs. The process includes using a first species of a microorganism to secrete a surfactant, a second species of microorganism that secretes a solvent which, in combination, provides for displacement of oil such that additional oil may be recovered from the well.

It is also known in the art to use various nutrients such as vitamins, phosphates, and various electron donors so as to stimulate native bacteria or to introduce bacteria so as to create a sufficient biomass layer which acts to disassociate the oil from the rock/soil formation thereby permitting the disassociated oil to be collected. One such process is described in U.S. Pat. No. 6,758,270 which is incorporated herein by reference.

The waste hydrocarbons from the existing processes are of major environmental concern. Tailings and oil bearing run-offs from these inefficient oil recovery processes can potentially contaminate nascent surface water, groundwater, sediments, and soil for years. In addition other chemicals, such as paraffins, are frequently added to the tars sands to enhance hydrocarbon removal. While aeration is used to remove some of these paraffins, residual paraffins remain and contaminate the water runoff. Paraffins are thus a growing regulatory concern.

It is also known in the art that hydrocarbon extraction can involve the mining of tar sands as part of an above-ground recovery process. The tar sands, even after conventional processing and treatment, contain a high percentage of hydrocarbons which are not readily extractable. The waste product from a tar sands recovery process still has a high percentage of hydrocarbons which cannot be readily separated using conventional technologies. Further, it is also known that hydrocarbon recovery from tar sands and similar processes will result in bitumen froth tailings which also have a high level of hydrocarbons that pose environmental hazards. There remains a need for an ability to both enhance recovery of viable product from such waste tailings as well as degrading any remaining unrecoverable hydrocarbon content so as to prevent environmental contamination from the tailings and hydrocarbon recovery waste.

While there is a great deal of teaching directed to use of microorganisms to enhance petroleum recovery, there remains room for improvement and variation within the art.

SUMMARY OF THE INVENTION

It is one aspect of at least one of the present embodiments to provide a method of microbial enhanced oil recovery.

It is yet another aspect of at least one of the present embodiments of the invention to provide a method for recovery of a useful oil fraction from either an above ground or below ground treatment of tar sands, oil-bearing rocks, oil-containing sand feeds, and other oil-containing slurries.

It is yet another aspect of at least one of the present embodiments of the invention to provide for a microbial enhanced oil recovery in which the microorganisms are tolerant of temperatures up to about 65° C. and may be introduced into an above ground or below ground oil-containing rock substrate by the use of heated water or low temperature steam.

It is yet another aspect of at least one embodiment of the present invention to provide for a consortium of microorganisms comprising at least one surfactant producing organism, the plurality of organisms having an ability to metabolize oil within an oil-bearing rock formation.

It is yet another aspect of at least one embodiment of the present invention to provide for a method for recovering oil from an oil-bearing reservoir, the reservoir having at least one injection well and at least one production well, the method comprising the steps of: introducing into the injection well of the reservoir, a microbial consortium selected from substantially pure cultures of microorganisms which are selected from the group consisting of ATCC Nos. PTA-5570 through PTA-5581 and a nutrient composition which comprises an aqueous solution of nutrients capable of supporting growth of the microorganisms of the formulation, the injected microorganisms capable of growth in the reservoir, at temperature ranges from about 20° C. to about 65° C.; maintaining the microbial consortium within the injection well for an amount of time sufficient for the microbial consortium to colonize within the reservoir; and following the step of maintaining the organisms, injecting a fluid into the injection well to drive a displaced oil to the production well.

It is yet another aspect of at least one embodiment of the present invention to provide for a method wherein said step of introducing a microbial consortium further comprises introducing a consortium which comprises selecting a surfactant producing microorganism from the group consisting of ATCC Nos. PTA-5570 through PTA-5581 and combinations thereof.

It is yet another aspect of at least one embodiment of the present invention to provide for a method wherein trace nutrients are injected prior to the injection of the cultures of microorganisms. Since these nutrients are trace in nature (ie minerals) they are not introduced volumetrically in the treatment process.

It is yet another aspect of at least one embodiment of the present invention to provide for a method wherein a microbial consortium can be added to remove residual paraffins in the downstream process of the tar sand processing. The treatment of paraffin within the sand tailings may be accomplished during the aeration step that is traditionally used to partially remove the paraffin component.

It is yet another aspect of at least one embodiment of the present invention to provide for a method wherein a microbial consortium can be used to upgrade the hydrocarbons after separation from the tars sands. Upgrading the hydrocarbons involves a stepwise treatment controlling the microbial enzyme activity to open ring structures of the separated PAHS to reduce processing costs.

It is yet another aspect of at least one embodiment of the present invention to provide for a method of microbial enhanced oil recovery for recovering oil from an oil-bearing rock formation, the formation including one inlet, the method comprising injecting water containing a mixture of bacteria selected from the group consisting of ATCC No. PTA-5570 through ATCC No. PTA-5581; allowing the microorganisms to colonize within the oil-bearing rock formation using the oil as a main carbon source, thereby establishing a biomass layer which acts to disassociate the oil from the rock formation; and removing the disassociated oil via either one of the inlet or a separate outlet.

It is yet another aspect of at least one embodiment of the present invention to provide for a method wherein the microorganisms are introduced simultaneously with a nutrient mixture.

It is yet another aspect of at least one embodiment of the present invention to provide for a method wherein at least one of the microorganisms produces a surfactant which acts to dislodge oil from the oil-bearing rock formations.

It is yet another aspect of at least one embodiment of the present invention to provide for a method wherein at least one of the microorganisms produces a surfactant which acts to separate oil from tar sands.

It is yet another aspect of at least one embodiment of the present invention to provide for a method wherein at least one of the microorganisms produces at least one of a surfactant or an enzyme which acts to separate oil from oil-bearing rock formations including tar sands.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
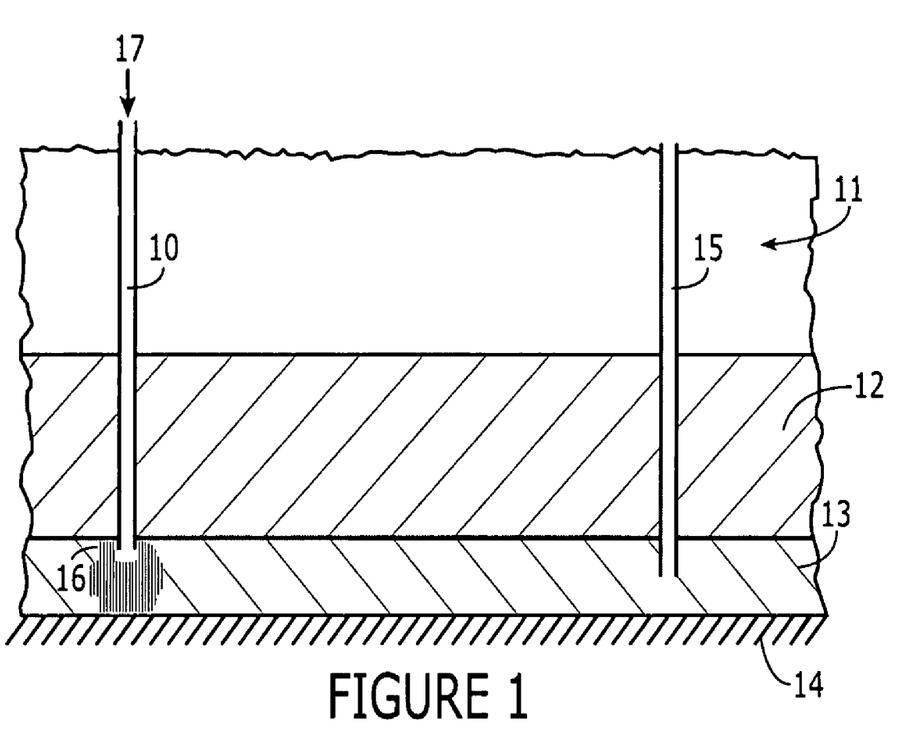
FIG. 1 is a schematic section showing a method according to the present invention for obtaining oil from an oil-bearing formation.

FIG. 1 shows an oil well having an injection well 10. Within the various core strata 12, there is an oil-bearing formation 14 and which is positioned above underlying bedrock 16.

An extraction well (borehole) 18 and the injection well 10 extend into the formation 14. Formation 14 may be in the form of numerous types of oil-bearing substrates including consolidated sandstone. In addition, formation 14 may also have present injection water associated with secondary removal activities.

Other typical oil-bearing formations may include any number of oil-containing reservoir rocks including crude oil remaining in an oil-bearing formation following exhaustive water flooding or the use of brine or saline solutions.

Bacteria useful in the microbial assisted oil recovery processes have been deposited with the American Type Culture Collection (ATCC) in Rockville, Md. on Oct. 9, 2003, and have the indicated ATCC designation numbers as set forth for isolates 1 through 12 in Table 1.

TABLE 1

Isolate identification.

| Isolate | Identification | ATCC Accession Number |
|---|---|---|
| 1) CZOR-L1B (KN-1) | ALCALIGENES-PIECHAUDII SRS | PTA-5580 |
| 2) BP-20 (KN-2) | RALSTONIA PICKETTII SRS | PTA-5579 |
| 3) CZOR-L1Bsm (KN-3) | PSEUDOMONAS-PUTIDA BIOTYPE B SRS | PTA-5581 |
| 4) BPB | FLEXIBACTER CF. SANCTI SRS | PTA-5570 |
| 5) BPC | PSEUDOMONAS FREDRIKSBERGENSIS SRS | PTA-5571 |
| 6) BPE | STAPHYLOCOCCUS WARNERI. LMG 19417 SRS | PTA-5572 |
| 7) BPF | SPHINGOMONAS SRS | PTA-5573 |
| 8) BPH | SPHINGOMONAS SP. S37 SRS | PTA-5574 |
| 9) BPI | PHYLOBACTERIUM SRS (α PROTEOBACTERIUM TA-A1) | PTA-5575 |
| 10) BPJ | SERRATIA FICARIA SRS (α PROTEOBACTERIUM TA12-21) | PTA-5576 |
| 11) BPK | AGROBACTERIUM TUMEFACIENS SRS | PTA-5577 |
| 12) BPL | RHIZOBIUM SP. SDW045 SRS | PTA-5578 |

Details on the isolates identified with ATCC accession numbers PTA-5570 through PTA-5581 are described in detail in U.S. patent application Ser. No. 10/712,491, filed on Nov. 13, 2003, and which is incorporated herein by reference.

The above identified isolates are useful in oil-recovery from rock formations and tar sands. Unless indicated otherwise, all examples set forth below make use of an aggregate consortium of all 12 isolates referenced above in Table 1. Certain of the isolates produce biosurfactants which help with the release and mobilization of the oil. Additionally, all of the isolates have the ability to bind and metabolize oil under aerobic conditions. The activity of the microorganisms is sufficiently robust that minimal supplementation by way of vitamins, electron donors, and other additives is kept to a minimum. According to this invention, it has been found that by regulating the supply of available oxygen, the amount of activity of the microorganisms can be controlled.

Given the ability of the microorganisms to use the oil substrate as a carbon source, problems associated with the plugging of an oil field by excessive growth of microorganisms that feed on supplemental carbon sources and have been used in prior art efforts to recover oil from rock formations are believed to be minimized.

EXAMPLE 1

Figure 3:
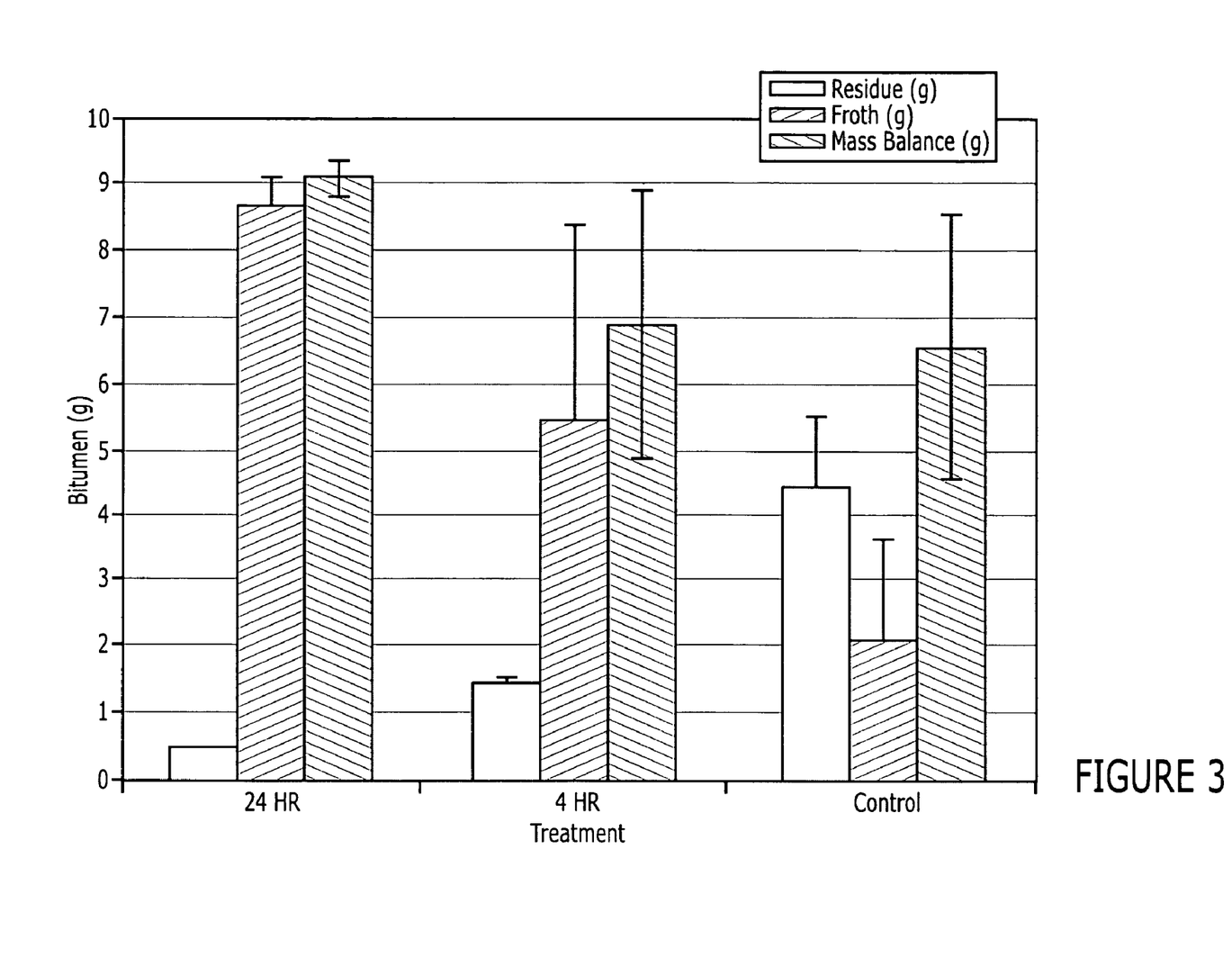
FIG. 3 is a chart setting forth comparisons of improvements in oil separation from sands following incubation with the microorganisms disclosed herein.

An oil/water/sediment separation flotation test commonly used within the petroleum industry was used to compare hot water extraction of oil sands with and without the prior incubation of a microbial consortium. In comparison to uninoculated controls, samples of oil sand deposits treated with microorganisms demonstrated a 50% improvement in separation efficiency following a four hour treatment and a seven fold increase following a 24 hour incubation time. As seen in reference to FIG. 3, the amount of petroleum residue remaining in association with the sand decreases while the recovered oil product ("Froth") as measured by the amount of bitumen (grams) recovery increases.

EXAMPLE 2

Separation efficiency of hydrocarbons from bituminous oil sands (Canadian Athabasca tar sands) was also demonstrated by comparing hydrocarbon separation in flasks containing oil sands. Control flasks had no amendments except growth media added while experimental flasks had the BioTiger™ microorganisms in media introduced to the flask. To inoculate the tar sands $10^6$ cells BioTiger™ from a growing culture were needed per gram of tar sands for 24 hours. Constant agitation was performed on both flasks for the entire 24 hrs. Following a treatment interval of 24 hours, visual evidence established that hydrocarbons were being separated from the sand substrate in the BioTiger® containing flask. These types of flask conditions mimic below ground conditions where flooded oil fields from a secondary removal process can be treated with the BioTiger™ consortium to bring about additional release of oil from the substrate. The agitation and flushing action of injected steam and/or water can be used to recover the released oil from a below ground rock formation. One advantage of the consortium of microorganisms used herein is that the organisms have demonstrated resistance to elevated temperatures such that use of injected steam and/or heated water does not destroy the efficacy of the organisms. Currently, tar sand sites do not use conventional MEOR organisms due in part to inactivation of the organisms by temperatures above 40° C. In addition, conventional microorganisms used for below ground extraction require higher levels of expensive nutrients for growth at tar sand sites which makes the process uneconomical.

EXAMPLE 3

Figure 4A:
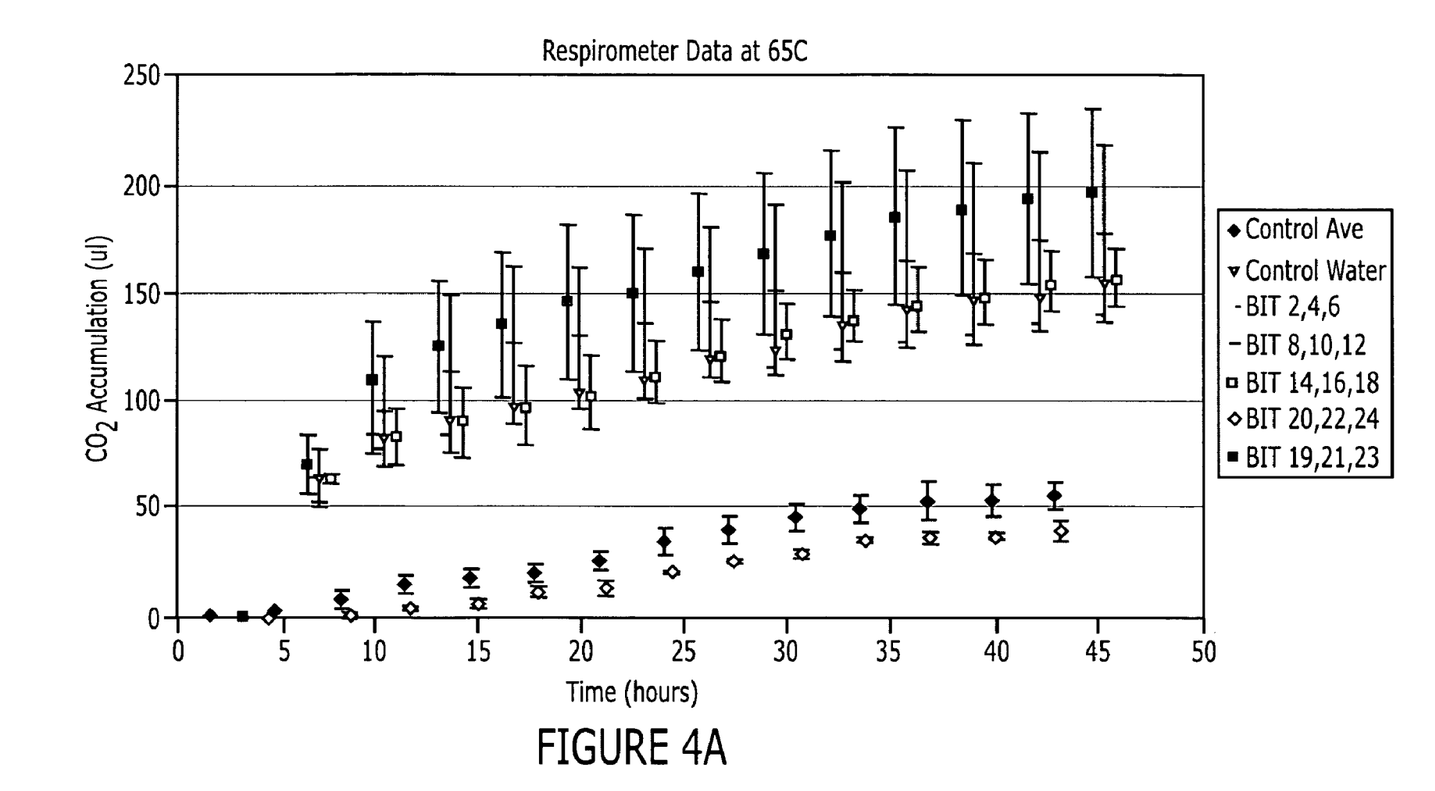
FIGS. 4A and 4B are graphs depicting metabolic activity of useful microorganisms using petroleum within an oil sand as a hydrocarbon source at temperatures of 65° C. and 30° C. respectively.
Figure 4B:
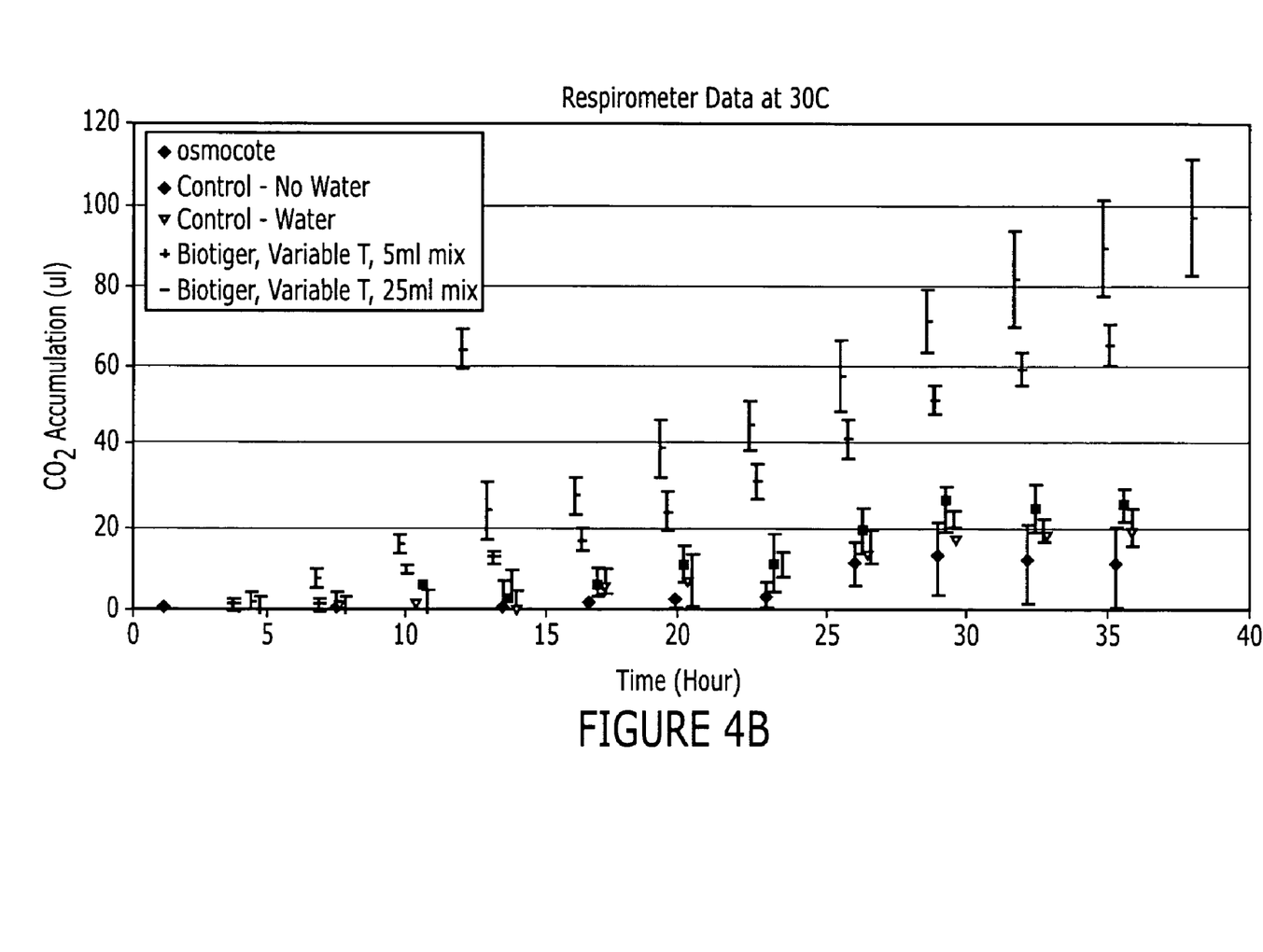

As set forth in FIGS. 4A & 4B, the BioTiger™ microorganisms demonstrate metabolic activity when introduced into the oil sands. As seen from the evolved $CO_2$ gases from inoculated samples, metabolic activity reflects active growth and metabolism of the BioTiger™ organisms. Light microscopy studies verify that the BioTiger™ organisms attached to the oil sands. While not wishing to be limited by theory, conventional thinking within petroleum recovery efforts using microorganisms suggest that the ability of the organisms to attach to the substrate is important in the subsequent release of oil from the formations using the combination of naturally produced surfactants as well as dislodging of oil particles created by the physical growth and colonization of the substrate by the microorganisms. The data set forth in FIGS. 4A and 4B demonstrates that the organisms are able to metabolize the oil present in the oil sands. Treatment conditions were at 65° C. and 30° C. without any nutrient amendments to the samples. The ability of the microorganisms to degrade and metabolize existing hydrocarbons allows more complex fractions of hydrocarbons to be broken down into lower weight, more desirable compounds. In addition, the minimal need to supplement the microorganisms with additional nutrients is believed to reduce the biofouling or plugging of injection sites that may otherwise occur. The sole carbon source used by the BioTiger™ organisms can be the hydrocarbons found within the substrate.

For a more rapid response, it is believed that the BioTiger™ microorganisms may be primed with the target matrix hydrocarbons, i.e., subsurface hydrocarbons, prior to application in a below ground injection or above ground treatment of tailings, oil sands, or other waste material. It is also believed that the BioTiger™ organisms are applicable to a variety of subsurface strata for oil and hydrocarbon recovery. Such strata may include clays, rocks, sand, ground water, sediments, and shale when used with either existing or new wells.

Further, the microorganisms are effective for oil/hydrocarbon recovery at temperatures ranging from about 20° C. to about 65° C. The lower temperature range is beneficial for reducing energy costs. In addition, the ability to tolerate temperatures in excess of 40° C. is an improvement over other microbial assisted protocols such that the population of introduced microorganisms are not depleted by elevated temperatures needed to introduce microorganisms or remove the dislodged oil.

It is believed that the consortium of microorganisms offer a unique ability to metabolize bituminous oil sands and which also exhibit useful metabolic activity under the temperature ranges set forth herein. It is well known that oil sand hydrocarbons have a tar-like polyaromatic hydrocarbon composition which makes separation of oil and other hydrocarbons difficult. The present consortiums of microorganism are able to bring about a rapid and high yield separation of the hydrocarbons from the substrate. It is believed that equally effective separation from less problematic hydrocarbons such as those located in rocks, shale, clay, sediments, gravel, and other strata would also result from treatment with the microorganisms. Optimizing this process would lead to increased petroleum recovery from tar sands.

As aerobic bacteria, the metabolic activity of the organisms in a separated oil product can be controlled simply by lowering the temperature and/or eliminating available oxygen. As has been demonstrated with other microorganisms and is known in the art, the microorganisms may be recycled from process water or recovered oil for renewed application.

An additional use for the BioTiger™ microorganisms may be found in reference to soil washing processes associated with environmental cleanup or treatment of hydrocarbon-containing tailings. As set forth in U.S. Pat. No. 6,074,558 entitled, "Biochemical Treatment of Bitumen Froth Tailings", assigned to BHP Minerals International, Inc., and which is incorporated herein by reference, the use of native tar sand hydrocarbon metabolizing microorganisms is disclosed which are used to treat process tailings which are comprised of a sludge of clay, fine sand, water, and bitumen. While the teachings in the '558 patent utilize native bacteria present within the tar sands, it is believed that use of the present microorganism consortium reported herein will offer enhanced recovery and separation of hydrocarbons while producing a reduced volume of waste material. The process described above is also believed effective in treating paraffin additives that may have been introduced to increase the efficiency of the hydrocarbon recovery. Observations to date indicate that the consortium of microorganisms reduce paraffins having additional side chains or aromatic groups attached. It appears that the paraffins are completely degraded since the paraffins do not accumulate as a result of the metabolic degradation of the more complex paraffin containing compounds. Based upon inventor observations, the consortium of microorganisms preferentially degrade fuel components in the following order: naphthalene and methyl-apthalenes, light n-alkanes (paraffins), and then progressively heavier n-alkanes. By reducing the paraffin content within the waste material, contamination caused by water runoff from the waste material can be significantly reduced.

The microorganism consortium is believed amenable to tar sands conditioning and mining because of the biological surfactants and enzymes which are produced and which allow the bitumen contained within the tar sands to be more efficiently separated from the clay and sand solids. One use of the consortium suspension involves direct injection into a tar sands deposit including a partially depleted or non-depleted oil reservoir. The subsequent growth and colonization by the microorganisms renders the tar sands more amenable to processing including recovery by an injection/extraction well or by mining the treated tar sands by substantially separating the bitumen from the sands and clays contained therein.

Figure 2:
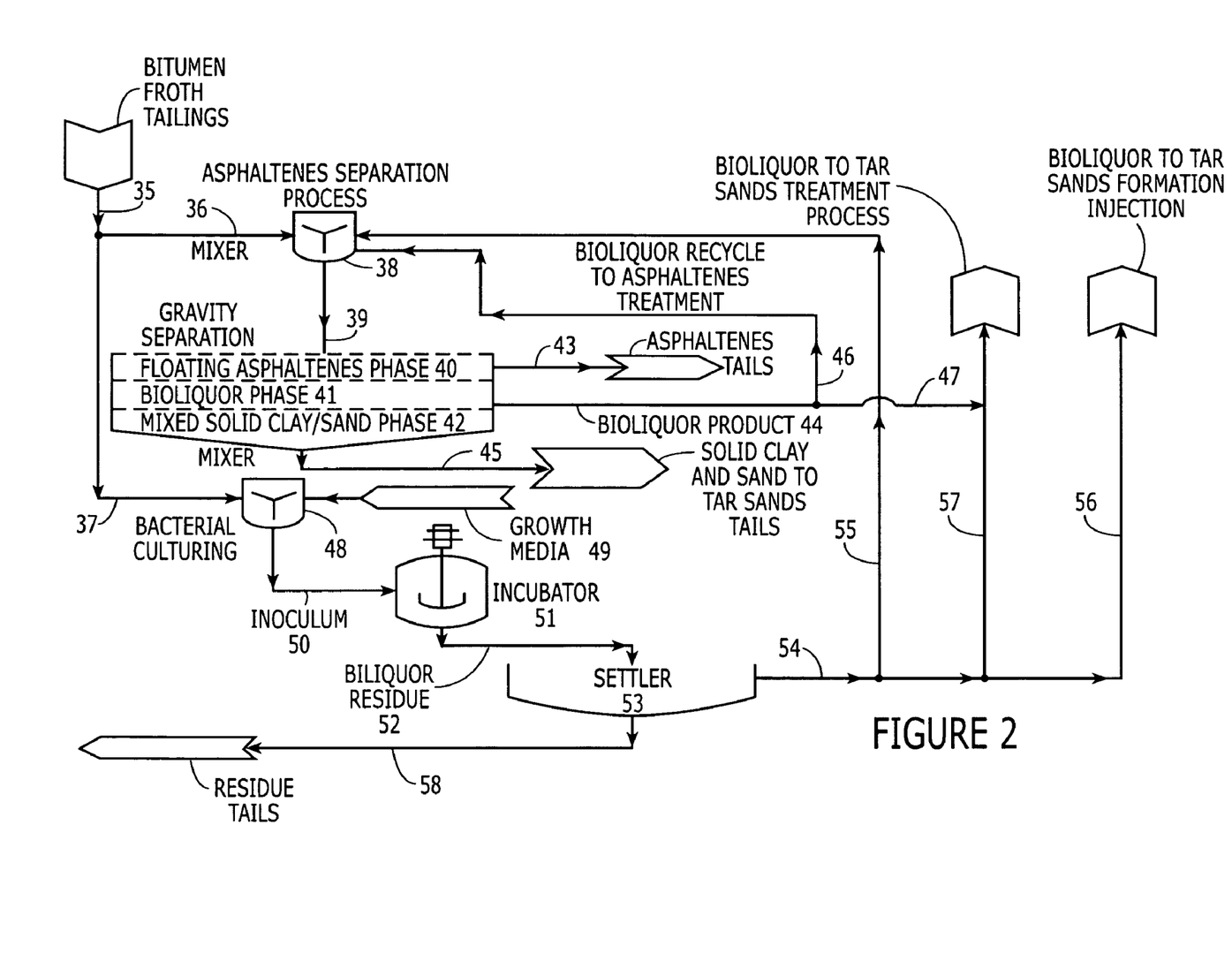
FIG. 2 is a schematic view showing a process of aboveground treatment of oil-bearing sands according to an aspect of the present invention.

The consortium of microorganisms is also useful in an above ground tar sands processing step such as that disclosed in the '558 patent and as seen in FIG. 2. In this way, the tar sand tailings produced as a by product of bitumen froth generation do not contain disbursed clays that would hinder the settling of solids in a tar sands tailing impoundment. Furthermore, use of the microorganism consortium with tar sands prior to subsequent processing results in lower bitumen losses to tails and higher levels of bitumen froth production.

U.S. Pat. No. 5,968,349 entitled, "Extraction of Bitumen From Bitumen Froth and Biotreatment of Bitumen Froth Tailings Generated From Tar Sands", and which is incorporated herein by reference, also describes a process which uses native microorganisms in an extraction and recovery process to produce a bitumen product substantially free of water, solids, precipitated asphaltenes, and bitumen froth tailings. A similar process making use of the consortium of microorganisms described herein in place of or in addition to the indigenous microorganisms is believed to be advantageous. The consortium of microorganisms is believed to have a broader temperature range of activity, has demonstrated efficacy in production of surfactants which bring about desirable separation of aromatic hydrocarbons, and can use the hydrocarbon source as the sole carbon source for metabolism.

Figure 5:
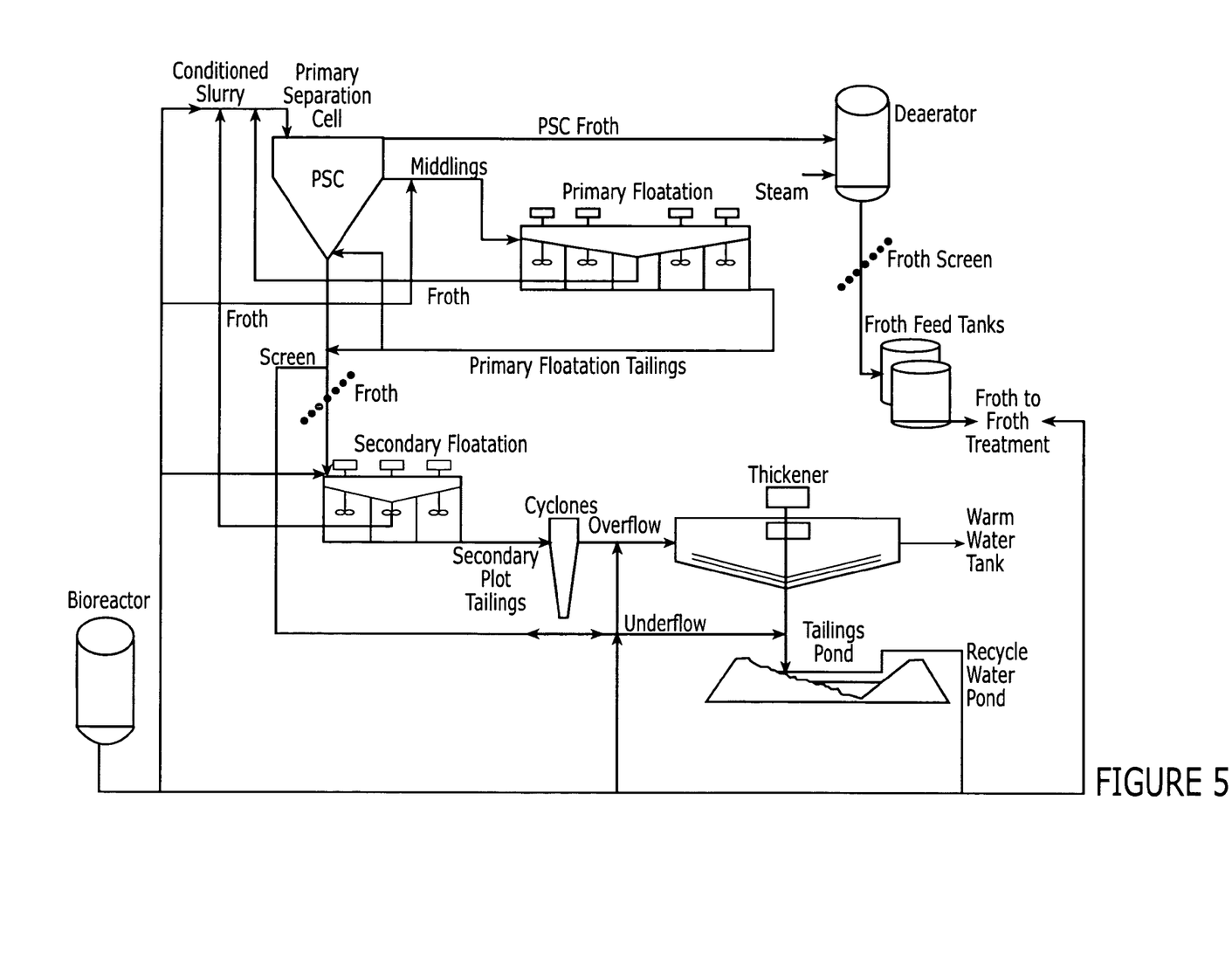
FIG. 5 is a schematic view showing a process of an above ground treatment of oil-bearing tar sands in an alternative embodiment of the invention.

As seen in reference to FIG. 5, there is a schematic pathway that may be used for a variety of above ground treatment processes of tar sands as well as various waste products and waste streams associated with a petroleum recovery process. As seen in the schematic figure, a bioreactor may be used to house a desired mixture of the consortium of microorganisms previously described. As seen from FIG. 5, the consortium of microorganisms may be introduced at numerous levels into the various process pathways including use of condition slurries into primary separation cells in flotation tanks, in the treatment of flotation tailings, froth treatment, secondary tailings, and treatment of tailings pond substrates as well as recycling of water from tailings pond. As indicated, the microorganisms can be introduced at multiple locations within a process treatment. In addition, it is envisioned that once introduced into the process pathway, the treatment process can be enhanced such that a portion of the introduced microorganisms can be partitioned in various separation zones such that the previously introduced microorganisms cycle through the desired process flow from process step to process step. In this way, the efficiency of the overall process is enhanced. In addition, to the extent the microorganisms have acclimated to the hydrocarbon constituents within the process stream, it is believed desirable to maintain those acclimated organisms in subsequent process steps.

However, where needed or where beneficial, additional microorganisms from the bioreactor may be introduced to further facilitate the process.

It is also known within the processing of tar sands to add paraffins to the tar sand mixture so as to enhance hydrocarbon removal. During the subsequent processing of tar sands, an aeration process is used which partially removes paraffins. However, a significant component of paraffins remains in the tar sand tailings. These tailings are known to release paraffin to water runoff which is of growing environmental concern. The paraffin hydrocarbon is a type of hydrocarbon which is believed degradable by use of the microbial consortium. Accordingly, it is believed that the microbial consortium, added to conventional waste tailings and treatment of tar sand process streams can be effective in substantially removing the added paraffin from the tar sand residues.

Injection wells and other hydrocarbon recovery techniques will often generate a mixture of water and hydrocarbons which requires separation. Frequently, there is a need to recycle the recovered water for use in additional process steps. To the extent the microbial consortium is present in the recovered water, the separated water containing consortium can be again injected back into the well. Conventional oil/water separation processes are sufficiently mild that the microorganisms remain viable following the water recovery process. The recovered water may either be used directly or may have additional microorganisms and/or nutrients introduced thereto prior to reinjection into the well.

To the extent recovered water is not to be reused and is to be introduced into an above ground reservoir or otherwise discharged, the microbial consortium present within the waste water can be used to further "polish" or treat the recovered water to additionally degrade the remaining hydrocarbon content.

A further use of the consortium of microorganisms in a hydrocarbon recovery process involves the ability of the microorganisms to reduce aromatic bonds of various hydrocarbon fractions. In addition, it is believed the microorganisms described herein can also reduce sulfur, nitrogen, and phosphorus bonds present within the hydrocarbons. The ability to reduce aromatic bonds and to react with other constituents in the oil mixture enhances the quality of the recovered product in terms of both subsequent downstream processing as well as facilitating transport of the recovered product through pipelines. The ability to reduce (open up) the aromatic bonds provides for a less viscous product that flows more easily and requires less energy for movement through a pipeline system.

Accordingly, it is believed that the demonstrated features of consortium of microorganisms render themselves useful for treatment and recovery of hydrocarbons from below ground rock formations as well as above ground treatment of waste tailings or mined tar sands. Such uses achieve a higher yield of useful hydrocarbons while minimizing the production of waste materials. The above processes do not require the use of hazardous solvents, but rely upon the combination of naturally produced biosurfactants along with the beneficial effects achieved through colonization of an oil-bearing substrate by the consortium of microorganisms. Control of the consortium activity in the subsurface by oxygenation, nutrient addition, temperature (i.e., warm water) and mixing can be done for optimization of any treatable substrate. The ability to vary the oxygen content, nutrient content, treatment temperature, and mixing levels can be accomplished without undue experimentation and are well within the skill of one having ordinary skill in the art.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A method for recovering oil from an oil-bearing reservoir, said reservoir having at least one injection well and at least one production well, said method comprising the steps of:
   introducing into said injection well of said reservoir, a microbial consortium selected from substantially pure cultures of microorganisms which are selected from the group consisting of ATCC Nos. PTA-5570 through PTA-5581 and a nutrient composition which comprises an aqueous solution of nutrients capable of supporting growth of said microorganisms of said formulation, said injected microorganisms capable of growth in said reservoir, at temperature ranges from about 20° C. to about 65° C.;
   maintaining said microbial consortium within said injection well for an amount of time sufficient for said microbial consortium to colonize within said reservoir; and,
   following said step of maintaining said microbial consortium, injecting a fluid into said injection well to drive displaced oil to the production well.

2. The method according to claim 1 further comprising injecting a consortium which comprises selecting a surfactant producing microorganism from the group consisting of ATCC Nos. PTA-5570 through PTA-5581 and combinations thereof.

3. The method according to claim 1 wherein said nutrients are injected prior to the injection of said cultures of microorganisms.

4. The method according to claim 1 wherein at least one of said cultures of microorganisms produces an enzyme and said enzymatic activity acts to dislodge oil from oil-bearing rock formations within said injection well.

5. A method of microbial enhanced oil recovery for recovering oil from an oil-bearing rock formation, the formation including one inlet, the method comprising injecting water containing a mixture of bacteria selected from the group consisting of ATCC Nos. PTA-5570 through ATCC No. PTA-5581;
   allowing said microorganisms to colonize within said oil-bearing rock formation using said oil as a main carbon source, thereby establishing a biomass layer which acts to disassociate said oil from said rock formation; and,
   removing the disassociated oil via either one of said inlet or a separate outlet.

6. The method according to claim 5 wherein the microorganisms are introduced simultaneously with a nutrient mixture.

7. The method according to claim 5 wherein at least one of said microorganisms produces a surfactant which acts to dislodge oil from said oil-bearing rock formations.

8. The method according to claim 5 wherein at least one of said microorganisms produces an enzyme and said enzymatic activity acts to dislodge oil from said oil-bearing substrate.

9. The method according to claim 5 wherein said injected water further comprises a recycled water containing a viable mixture of said bacteria which were recovered from said removed disassociated oil.

10. A method for recovering oil from at least one of an above ground waste tailings material or oil sands comprising the steps of:

introducing into a hydrocarbon substrate a microbial consortium selected from substantially pure cultures of microorganisms which are selected from the group consisting of ATCC Nos. PTA-5570 through PTA-5581 and a nutrient composition which comprises an aqueous solution of nutrients capable of supporting growth of said microorganisms, said microorganisms capable of growth on said hydrocarbon substrate at a temperature range from about 20° C. to about 65° C.;

maintaining said microbial consortium within said hydrocarbon substrate for an amount of time sufficient for said microbial consortium to colonize and metabolize hydrocarbons within said substrate; and, separating a non-hydrocarbon containing substrate from said hydrocarbon substrate, thereby providing at least one of a reduced volume of hydrocarbon contaminated waste or a separated fraction of hydrocarbon.

11. The method according to claim 10 wherein said waste tailings or said oil sands further comprises a paraffin material.

* * * * *